UNITED STATES PATENT OFFICE.

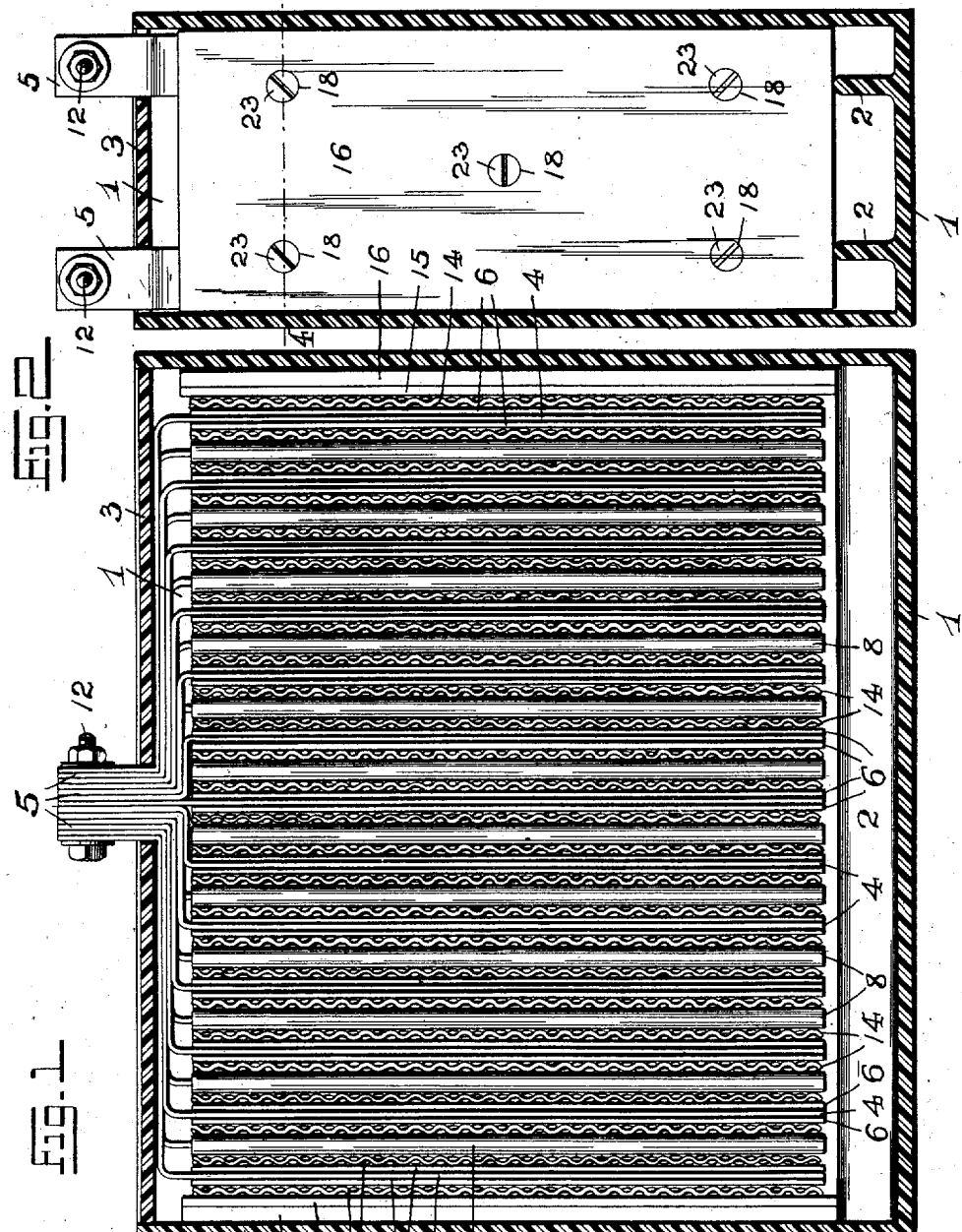

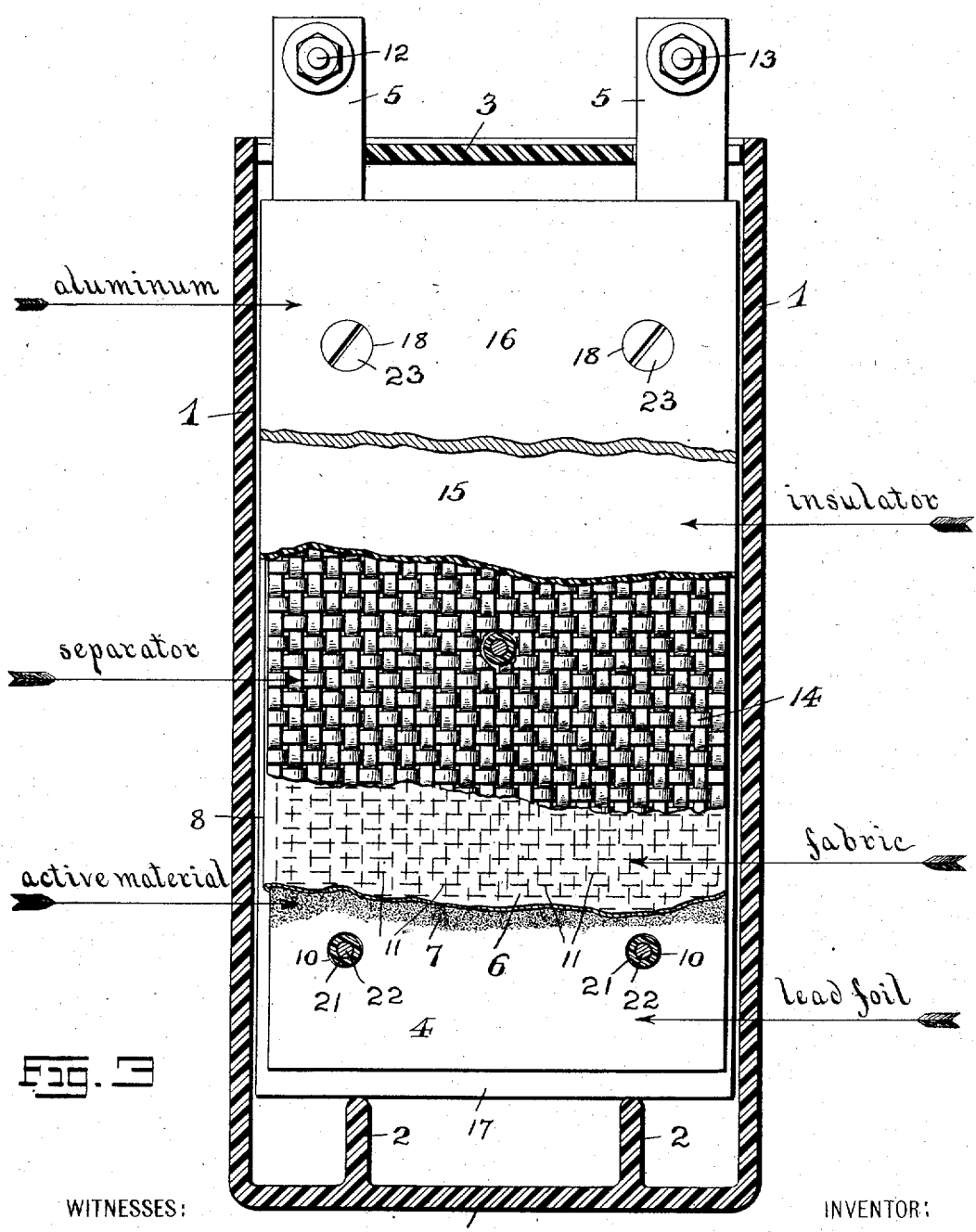

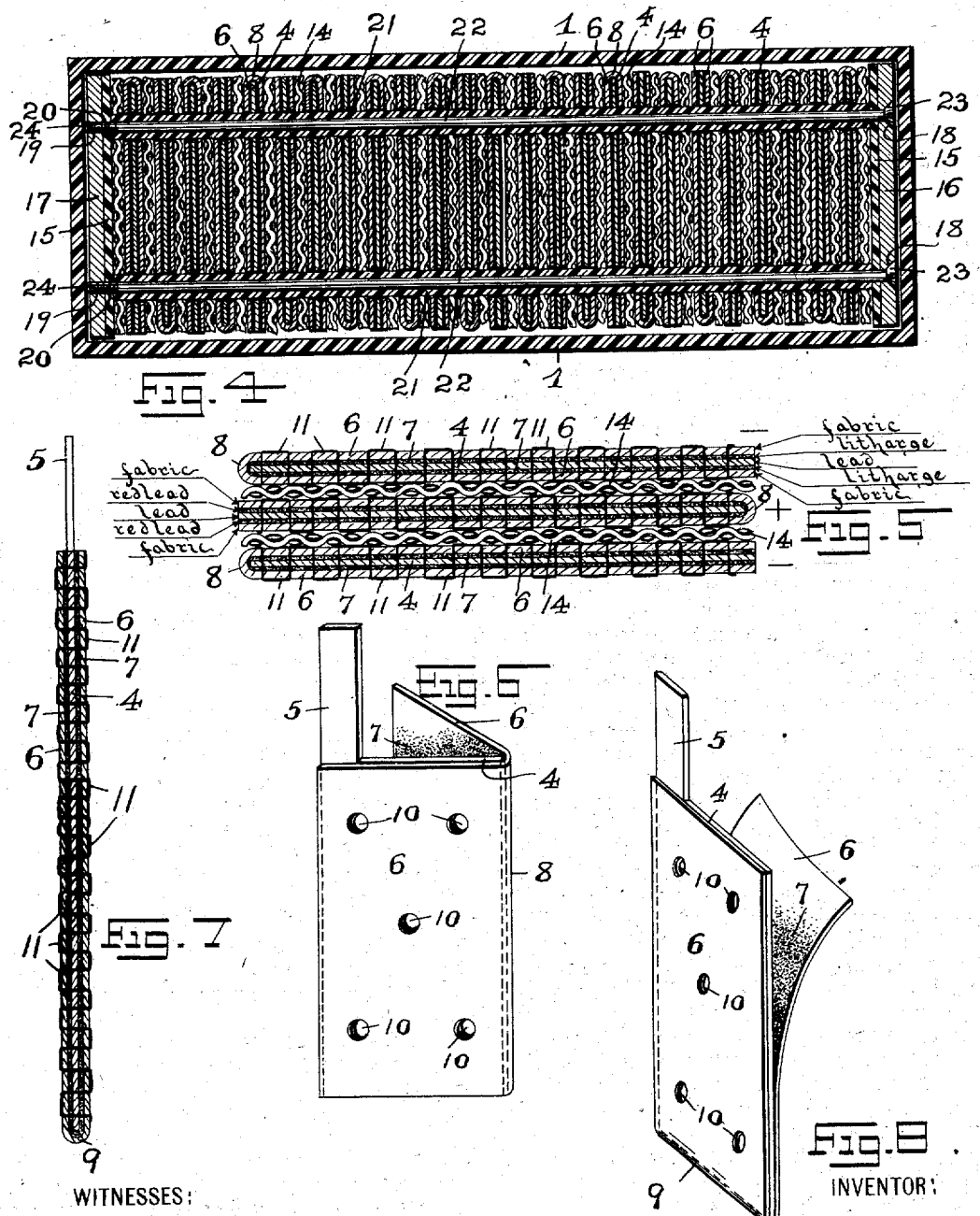

FRITZ A. FELDKAMP, OF NEWARK, NEW JERSEY.

STORAGE BATTERY.

SPECIFICATION forming part of Letters Patent No. 726,272, dated April 28, 1903.

Application filed July 8, 1902. Serial No. 114,746. (No model.)

*To all whom it may concern:*

Be it known that I, FRITZ A. FELDKAMP, a subject of the Emperor of Germany, residing at Newark, in the county of Essex and State of New Jersey, have invented certain new and useful Improvements in Storage Batteries; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates to improvements in storage batteries; and the invention has for its principal objects to provide an operative and effective storage battery or a reversible galvanic battery in which the weight of the battery has been greatly reduced and the life of the battery has been correspondingly increased and in which the use of "grids," as commonly termed, for the support of the active material has been dispensed with; furthermore, to provide a storage battery in which the active material is most perfectly retained in place, in which the support for the active material is of a novel departure, in which the electrodes are thin sheets of metal or metal foil, such as lead-foil or any other suitable material of minute thinness, against the surface of which the active material is arranged in the manner hereinafter stated by means of a suitable tissue or a porous fabric—such as parchment, paper, linen, felt, asbestos fabric, or other similar material of a very thin, light, and porous nature—which is painted, impregnated, or otherwise provided with the active material, and thereby forms a complete part of the tissue or fabric by being incorporated therein and being properly retained in the interstices or meshes of the fabric, all in the manner and for the purposes to be hereinafter more fully specified.

Other objects of my present invention are a novel construction of separator adapted to be arranged between the novel electrodes or plates of my invention and the production of a novel means for operatively securing and connecting any number of such plates and separators to provide a complete battery-cell and one in which the disintegration of the electrodes is reduced to a minimum.

In storage batteries, as is well known, with a slow discharge of the battery, that is the consumption in amperes per square surface, that a greater capacity and longer life of the battery is the result. It has been demonstrated that with plates which were being discharged in four hours and produced one hundred and ninety ampere hours the same plates when being slowly discharged, say from eight to ten hours, produced two hundred and seventy ampere hours. Furthermore, it has been shown in the use of electric vehicles that in running up grades the consumption of electric current required under such conditions to perform the necessary extra work is quite large and is such that the batteries as now generally made are not capable of producing for any length of time the required amount of electric current at the increased rate of work to be performed and the plates soon become overworked and are rendered utterly useless. The cause of all this lies in the fact that the active material in the pasted or grid constructions of plates is of insufficient porosity or the plates themselves are of too great a thickness, or both, to permit the electrolyte to act with the necessary rapidity upon the active material, and, furthermore, on account of the fact that the electrolyte is capable of acting a slight distance merely into the surface of the electrode (to a depth of about one thirty-second of an inch) the resistance on account of the too-small plate-surface is too great to derive from the battery for any great length of time electric current of the necessarily high amperage; furthermore, in batteries now in general use with electric automobiles to provide a rigid and staple plate, and since the metal of lead is comparatively soft and pliable plates of considerable thickness have to be used to in any manner meet the excessive requirements of a storage battery for automobiles. Hence the great weight of the battery and the large and abnormal consumption of active material during the high rates of discharge necessary in automobiling.

It has been fully demonstrated in practice that with the storage batteries now in use with a rate of discharge equal to ten hours .53 ounces of $PbO_2$ or peroxid of lead and the same weight of spongy lead are consumed, with a rate of discharge equal to five hours the consumption is equal to .62 ounces, with a rate of discharge equal to three hours the consumption is equal to .70 ounces, and for a rate of discharge equal to one hour the consumption is equal to one ounce, all of which goes to prove, conclusively that the greater the work required to be performed of the battery in ampere-hours the more rapid will be the deterioration of the battery-plates and the heavier the plates must necessarily be. The immediate cause of all this is the considerable thickness of the lead plates employed, the greater portion of the interior of each plate being inaccessible, and therefore unaffected by the electrolyte, this portion of each plate thus remaining inert and dormant, and hence the low efficiency and short life of a storage battery when used under heavy charges. To overcome these serious difficulties and to produce an efficient, light, and durable storage battery or a reversible galvanic battery is the main purpose of my invention, and since it is a well-demonstrated fact that the electrolytic action takes place upon the surface of the plates merely to a depth of about one thirty-second of an inch, or thereabout, I have therefore decided to reduce the active material and to increase the surfaces of the plates—that is, by using in the same cell-space a larger number of plates—whereby I have obtained a battery in which the discharges of from fifty to seventy-five amperes are still normal and whereby the construction of my novel form and arrangement of the parts of the storage battery renders it most useful for automobiling purposes, especially in running up grades, without danger of any abnormal discharge and the consequent deterioration of the plates.

Of course I am fully aware that to accomplish these results, the same being the main purposes of the present invention, the thickness of the metal electrodes or plates has to be reduced to a minimum, and this I have accomplished, the metal preferably employed being in my novel battery extremely thin sheets of lead or lead-foil of .004 to .01 of an inch in thickness arranged between portions of a very thin tissue or porous fabric which is painted or impregnated with or otherwise provided with the active material, the plates thus produced being assembled with very thin separators, also novel in themselves, arranged between the tissue or fabric covered plates and then securely united and maintained under pressure by means of the fastening means, preferably as and in the manner hereinafter fully set forth, and then placed in the usual construction and usual size of hard-rubber or other cell or receptacle now in use with storage batteries, such as are now employed with electric vehicles.

My invention therefore consists in the novel storage battery hereinafter more particularly described, as well as in the novel arrangements and combinations of the parts thereof and in the details of the construction of each plate or electrode, as well as that of the separators, all of which will be fully set forth in the following description and then finally embodied in the clauses of the claim.

My invention consists, furthermore, in the novel construction of as well as in the combination of an electrolyte with a lead plate of minimum thinness in the form of a thin sheet or foil enveloped or incased in a thin tissue or fabric—such as parchment, paper, linen, asbestos fabric, or other similar material of a porous character—upon which is spread, painted, or otherwise produced a layer of active material, the same being placed in close contact with the surface of the thin sheet of lead or lead-foil, to thereby provide an electrode of extreme thinness and of greatly-reduced weight.

My invention consists, furthermore, in the assemblage of from twenty-three to thirty of such electrodes in the battery cell or receptacle of the ordinary size and construction now in use with electric vehicles, the dimensions usually being two and five-eighths multiplied by six multiplied by eleven inches, and thereby providing a complete battery-cell of approximately ten pounds in weight.

The invention is clearly illustrated in the accompanying drawings, in which—

Figure 1 is a longitudinal vertical section of one form of complete battery-cell with the assembled battery elements represented in end elevation, the various parts, however, for the sake of clear illustration as to construction being shown entirely out of proportion—in other words, the combined lengths of the battery-cell and parts therein being considerably exaggerated or enlarged and the heights of the said parts being considerably reduced. Fig. 2 is a transverse vertical section of the battery-cell with the assembled plates therein represented in end elevation. Fig. 3 is a diagrammatic sectional representation (a transverse vertical section) of the various parts comprising one complete battery-cell and its elements. Fig. 4 is a horizontal section taken on line 4 4 in Fig. 2; and Fig. 5 is a horizontal section, in detail and on an enlarged scale, of three of the electrodes and intermediately-placed separators all embodying the principal features of the present invention. Fig. 6 is a perspective view of one of the lead plates and inclosing tissue or fabric bearing the active material. Fig. 7 is a vertical section of one of the lead plates and the inclosing tissue or fabric bearing the active material, but illustrating a modified arrangement of the said tissue or fabric upon the opposite sides of the said plate; and Fig. 8 is a perspective view of the said parts represented in said Fig. 7.

Similar characters of reference are employed in all of the said hereinabove-described views to indicate corresponding parts.

Referring to the said drawings, the reference character 1 indicates the usual form of hard-rubber or other suitable cell or receptacle provided upon its base with the usual ribs or supports 2, upon which the assembled plates are to be placed, and 3 indicates the usual cover.

Each plate is indicated by the reference-numeral 4 and consists of a single continuous sheet of metal made, preferably, of very thin sheet-lead or lead-foil of about .004 to .01 of an inch in thickness and each plate being provided with the contact-strip 5. Since it is an utter impossibility to provide such extremely thin plates with an active material, I employ a suitable porous fabric or tissue 6— such as parchment, paper, linen, felt, asbestos fabric, or any other suitable and similar fabric which is of extreme thinness—which is provided with the active materials 7 either by impregnation, painting, or otherwise applying the said active material to the said fabric or tissue, preferably in the manner to be hereinafter more fully set forth. In practice I prefer to cut the tissue or fabric 6 of about twice the surface areas of the two opposite sides of each plate 4, and I then provide one of these large surfaces of each piece of tissue or fabric 6 by painting thereon or by any other application with the proper active materials 7 and allow the same to penetrate the said tissue or fabric to a depth of about one sixty-fourth of an inch, or thereabout, the active material having previously been moistened with water or the like to produce a paste-like mass, which can be easily applied. Each piece of fabric or tissue 6 is then placed with its surface which has thus been treated to the application of the active material against the opposite sides of the plates 4 either by folding the piece of tissue or fabric 6, as at 8, about one of the vertical marginal edges of the plate, as illustrated in Fig. 6 of the drawings, or by folding the fabric or tissue 6, as at 9, about the lower marginal edge of the plate, as clearly represented in Figs. 7 and 8 of the drawings.

As will be seen from an inspection of Fig. 5 of the drawings, the active material with which the fabric or tissue is provided and which is to be placed about the plate 4 to produce the positive-pole electrode consists of red lead or triplumbic tetroxid, ($Pb_3O_4$,) and the active material with which the fabric or tissue 6 is provided and which is placed about another plate 4 to produce the negative-pole electrode is litharge or the monoxid of lead, (PbO.)

After the respective lead plates or thin sheets of lead-foil 1 have been arranged between the folded portions of the fabric or tissue provided, respectively, with the $Pb_3O_4$ and the PbO and with the prepared surfaces of active material directly against the lead plates to produce a perfect and close contact each fabric-covered plate is suitably pressed out and ironed flat to bring the various surfaces in close contact. Each fabric-covered plate is then placed beneath the needle of an ordinary sewing-machine and the fabric and lead plate sewed together with ordinary thread and with any number of suitably-disposed and preferably closely-placed stitches 11, whereby the fabric and the sheet-lead or lead-foil are closely united and securely connected and the prepared surfaces of the fabric intimately united with the plain surfaces of the thin lead sheets or lead-foil, as will be clearly evident. In this manner the active material is advantageously arranged and securely, uniformly, and most effectively disposed over the entire area of the surfaces of the lead plates, and that without the direct application of the active material to the plates, as heretofore, and which in the present case of the employment of extremely-thin sheets of lead or lead-foil would be an impossibility. Each completed plate or electrode is then dipped in a solution of sulfuric acid and water (about one of sulfuric acid to two of water) and then cleansed in clear water, whereupon each plate is again dipped in a bath of ammonia diluted with water, the purpose being to render the fabric and the threads with which the fabric is attached to the metal plate non-attackable to any action of the acid solution of the battery. It will also be evident that the act of stitching or sewing fast the fabric 6 upon the plate 4 has caused the sewing-needle to provide each plate 4 with innumerable and closely-disposed perforations, thereby resulting in a porous lead plate into and through which the electrolyte can readily flow and there will be a free circulation of the electrolyte directly through the entire body of each plate not heretofore accomplished when the positive and negative electrodes have been assembled and secured within the cell or receptacle 1 in the manner to be presently described. After the plates 4 and the prepared fabric 6 have in this manner been united a suitable number of openings or holes 10 are provided, as represented in Figs. 6 and 8, the number in the present case being five; but I may use a smaller or a larger number of such holes, as will be clearly understood. In assembling the combined plates 4 and fabric 6 to provide the complete battery elements the positive and negative electrodes are alternately arranged with the contacts 5 of the positive electrodes placed at the one side, as illustrated in Figs. 2 and 3, and connected by a contact-bolt 12 or other means of attachment for the usual circuit-wires and the contact 5 of the negative electrodes all arranged at the other side, as represented in said Figs. 2 and 3, and connected by a contact-bolt 13 or other means of attachment for the end of the other circuit-wires.

Between each pair of adjacent electrodes I have arranged a separator 14 of a thin and light inactive material, preferably in the form of a tresswork, as clearly illustrated in the several figures of the drawings. This tresswork is preferably made of interwoven strands, preferably strands of cane, in the manner of the construction of the seats employed with chairs; but it will be understood that the separators 14 may be made of any other inactive material, such as thin pieces or bands of wood. The tresswork herein shown, however, is the preferred form, since the interwoven strands or bands provide innumerable raised and depressed portions which form pockets or receptacles for the electrolyte and also provide many openings or passage-ways for a perfect and free circulation of the electrolyte directly through said separators and thence into and through the fabric or tissue 6 and each lead plate 4, in the manner herein-above stated. Another advantage obtained by the use of such tresswork, whether of strands of cane or of wood, is that when the assembled separators and electrodes, both positive and negative, are operatively secured together in the manner to be presently described the loosely-interwoven strands of the tresswork are additionally compressed, so that a minimum space will be occupied by each separator between each pair of adjacent electrodes, with the final result that I can arrange within the cell or receptacle of the uniform size and capacity now in commercial use an increased number of separators and an increased number of positive and negative plates or electrodes.

From an inspection of Figs. 1 and 4 it will be seen that I have arranged against the outer surfaces of the two end electrodes a separator 14 and against the outer surface of each separator 14 I have placed a suitable end plate 15, made of an insulating material, as rubber or other suitable material which is a non-conductor of electricity. Against the outer surfaces of said insulator-plates 15 I have finally arranged a pair of metal plates 16 and 17, which are preferably of aluminium, which are preferably employed on account of their light weight; but it will be understood that any other suitable metal plates, such as copper, may be employed. The plates 15, as well as the plates 16 and 17, are reduced to a minimum thickness, the plates 16 and 17 being usually one-sixteenth of an inch in thickness, which is sufficient to give stability and rigidity and prevent the "buckling" of the electrodes of the battery. The plate 16 is provided with a number of countersunk holes 18, while the plate 17 is made with correspondingly-disposed holes 19, which are provided with screw-threads. The insulator-plates 15 are also provided with correspondingly-placed holes 20. As illustrated in said Figs. 3 and 4, the several separators 14 and the alternately-disposed electrodes are arranged upon suitable tubes 21 of suitable insulating material, which tubes are passed through the holes 10 in the said electrodes and through correspondingly-placed openings in the tresswork of the separators 14, the said tubes 21 being of such lengths that when the electrodes and separators are compressed to the desired extent to bring as many electrodes and separators between the insulator-plates 15 as possible the respective ends of said tubes 21 will abut and lie in close and positive contact with the inner surfaces of said insulator-plates 15, as shown. Suitable tie-bolts 22 are passed through the several holes in the plates 16, 17, and 15 and the tubes 21, the screw-heads 23 of said bolts 22 being fitted in the countersunk holes 18 of the outer metal plate 16 and the opposite and screw-threaded end portions 24 of said bolts 22 being screwed into and securely retained in the screw-holes 19 of the metal end plate 17. Thus it will be clearly evident that by screwing up the bolts 22 the various devices and parts are tightly compressed and drawn together to permit of a maximum number of electrodes and loosely-woven separators to occupy the available space between the two insulator-plates 15, and the screw-heads 23 of the bolts 22 being flush with the outer surface of the end plate 16 and the screw-threaded ends 24 of said bolts 22 being flush with the outer surface of the end plate 17 the maximum length of the combined and assembled parts is such that the active members and separators held between the various end plates can be snugly fitted into the cell or receptacle 1 without the loss of any of the available space of said cell or receptacle.

As has been stated, the end plates 16 and 17 are made of aluminium or copper, preferably aluminium; but any other metal which does not undergo decomposition from the sulfuric acid used may be employed.

The positive adhesion between the fabric or tissue provided with the active material and the surfaces of the lead plates and the compactness with which the parts are connected by means of the tie-bolts prevents any buckling of the parts, and the disintegration due to the jarring to which the batteries are put in electrical vehicles when passing over rough roads and at great speeds is clearly avoided, and there will be no falling off or dislodging of the active material which would otherwise collect and settle in the bottom of the receptacle or cell 1 to produce short-circuiting, as is now so often the case in the storage batteries in ordinary use.

I am aware that changes may be made in the various arrangements and combinations of the parts without departing from the scope of my invention. Hence I do not limit my invention to the exact arrangements and combinations of the parts as described herein and as illustrated in the accompanying drawings, nor do I confine myself to the exact details of the construction of the said parts.

With my novel construction of battery, the normal capacity being seventy-five amperes, before there will be any overworking of the battery it will be clearly seen that I can use twenty-five, thirty, fifty, and even more amperes at a slow rate of discharge without a deterioration due to overworking. The life of my form of battery will therefore be proportionately greater than the life of the batteries now in ordinary use, and I have produced a battery of greater permanence and one in which more energy will be stored per unit of weight than with any other battery construction at present in practical use.

If desired, the life of the battery can still further be increased by increasing the thickness of the lead plates and still retaining in the receptacle or cell 1 a greater number of plates than at present, the battery still being much lighter than at present.

Another method of preparing the fabric or tissue 6 with the active material is by impregnation and is as follows: The porous fabric of the proper size, according to the size of the metal plate, is placed in a solution of acetate of lead or nitrate of lead, permitting the solution to thoroughly permeate the fabric. The fabric, still moist, is then placed between a pair of zinc plates, whereupon the metallic lead becomes separated and is retained directly in the pores of the fabric and forms a part and parcel of the same. This treatment is repeated a sufficient number of times until the pores of the fabric are completely filled with lead, and approximately a lead plate is provided.

In lieu of the use of the zinc plates zinc in the form of powder may be sprinkled upon one or both sides of the fabric which has been soaked in the solution of acetate of lead or nitrate of lead, this treatment having this advantage, that the separating process proceeds with greater rapidity. The plates produced in this manner are then washed in clean water and are then stitched or sewed fast to the thin lead sheets or lead-foil in the manner hereinabove described.

A battery constructed according to the principles of my invention and in the manner hereinabove described can be overcharged and fully discharged without any injury to the plates.

Having thus described my invention, what I claim is—

1. A compound electrode for storage batteries, comprising a thin metal plate, and a porous fabric, an active material applied directly upon the outer surface of said fabric, and said fabric being arranged in close contact with a surface of said thin metal plate, substantially as and for the purposes set forth.

2. A combined electrode of storage batteries, comprising a thin metal plate, a porous fabric provided with an application of active material, said fabric being arranged in close contact with a surface of said metal plate, and stitching passing through said fabric and said metal plate, substantially as and for the purposes set forth.

3. A compound electrode for storage batteries, comprising a thin metal plate, and a porous fabric of approximately double the size of said metal plate, an active material applied directly upon the outer surface of said fabric, and said fabric being folded upon itself and arranged in close contact against the opposite sides of said metal plate, substantially as and for the purposes set forth.

4. A compound electrode for storage batteries, comprising a thin metal plate, and a porous fabric of approximately double the size of said metal plate, and said fabric being provided with an application of active material, said fabric being folded upon itself and arranged in close contact against the opposite sides of said metal plate, and stitching passing through said fabric and said metal plate, substantially as and for the purposes set forth.

5. A compound electrode for storage batteries, comprising a thin and flexible sheet of lead-foil, and a porous fabric, and an active material applied to one side only of said fabric, the side bearing said active material being in close contact with a surface of said lead-foil, substantially as and for the purposes set forth.

6. A compound electrode for storage batteries, comprising a thin and flexible sheet of lead-foil, a porous fabric provided with an application of active material, said fabric being arranged in close contact with a surface of said lead-foil, and stitching passing through said fabric and said lead-foil, substantially as and for the purposes set forth.

7. A compound electrode for storage batteries, comprising a thin and flexible sheet of lead-foil, and a porous fabric of approximately double the size of said lead-foil, and said fabric being folded upon itself and arranged in close contact against the opposite sides of said lead-foil, substantially as and for the purposes set forth.

8. A compound electrode for storage batteries, comprising a thin and flexible sheet of lead-foil, and a porous fabric of approximately double the size of said lead-foil, said fabric being provided with an application of active material, and said fabric being folded upon itself and arranged in close contact against the opposite sides of the said lead-foil, and stitching passing through said fabric and said lead-foil, substantially as and for the purposes set forth.

9. In a storage battery, in combination, a series of positive and negative electrodes, each electrode comprising a thin metal plate, pieces of porous fabric, an active material upon the outer surface of each piece of fabric and arranged in contact with the surfaces of said metal plates, a separator of an inert material between said electrodes and at the outer surfaces of the two end electrodes, and means for securing said electrodes and separators 10. In a storage battery, in combination, a series of positive and negative electrodes, each electrode comprising a thin metal plate, pieces of porous fabric provided with an application of active material against and in close contact with the surfaces of said metal plates, stitches passing through said pieces of fabric and said metal plates, a separator of an inert material between said electrodes and at the outer surfaces of the two end electrodes, and means for securing said electrodes and separators under pressure and thereby retaining them in position, substantially as and for the purposes set forth.

11. In a storage battery, in combination, a series of positive and negative electrodes, each electrode comprising a thin metal plate, pieces of porous fabric, each piece of fabric being of approximately double the size of a metal plate, an active material upon the outer surface of each piece of fabric and each piece of fabric being folded upon itself and arranged in close contact against the opposite sides of said metal plates, a separator of an inert material between said electrodes and at the outer surfaces of the two end electrodes, and means for securing said electrodes and separators under pressure and thereby retaining them in position, substantially as and for the purposes set forth.

12. In a storage battery, in combination, a series of positive and negative electrodes, each electrode comprising a thin metal plate, pieces of porous fabric, each piece of fabric being of approximately double the size of a metal plate, each piece of fabric being provided with an active material and each piece of fabric being folded upon itself and arranged in close contact against the opposite sides of said metal plates, stitching passing through said pieces of fabric and said metal plates, a separator of an inert material between said electrodes and at the outer surfaces of the two end electrodes, and means for securing said electrodes and separators under pressure and thereby retaining them in position, substantially as and for the purposes set forth.

13. In a storage battery, in combination, a series of positive and negative electrodes, each electrode comprising a thin metal plate, pieces of porous fabric, each piece of fabric being of approximately double the size of a metal plate, and each piece of fabric being folded upon itself and having its treated surface arranged against and in close contact with the opposite sides of a metal plate, stitching passing entirely through said pieces of fabric and said metal plates, a separator of an inert material between said electrodes and at the outer surfaces of the two end electrodes, and means for securing said electrodes and separators under pressure and thereby retaining them in position, substantially as and for the purposes set forth.

14. In a storage battery, in combination, a series of positive and negative electrodes, each electrode comprising a thin and flexible sheet of lead-foil, pieces of porous fabric provided with an application of active material arranged against and in close contact with the surfaces of said lead-foil, a separator of an inert material between said electrodes and at the outer surfaces of the two end electrodes, and means for securing said electrodes and separators under pressure and thereby retaining them in position, substantially as and for the purposes set forth.

15. In a storage battery, in combination, a series of positive and negative electrodes, each electrode comprising a thin and flexible sheet of lead-foil, pieces of porous fabric, each piece of fabric being of approximately double the size of a sheet of lead-foil, each piece of fabric being provided with an active material and each piece of fabric being folded upon itself and arranged in close contact against the opposite sides of said lead-foil, a separator of an inert material between said electrodes and at the outer surfaces of the two end electrodes, and means for securing said electrodes and separators under pressure and thereby retaining them in position, substantially as and for the purposes set forth.

16. In a storage battery, in combination, a series of positive and negative electrodes, each electrode comprising a thin and flexible sheet of lead-foil, pieces of porous fabric, each piece of fabric being of approximately double the size of a sheet of lead-foil, each piece of fabric being provided with an active material and each piece of fabric being folded upon itself and arranged in close contact against the opposite sides of said lead-foil, a separator of an inert material between said electrodes and at the outer surfaces of the two end electrodes, and means for securing said electrodes and separators under pressure and thereby retaining them in position, substantially as and for the purposes set forth.

17. In a storage battery, in combination, a series of positive and negative electrodes, each electrode comprising a thin and flexible sheet of lead-foil, pieces of porous fabric, each piece of fabric being of approximately double the size of a sheet of lead-foil, and each piece of fabric being folded upon itself and having its treated surface arranged against and in close contact with the opposite sides of said lead-foil, stitching passing through said pieces of fabric and sheets of lead-foil, a separator of an inert material between said electrodes and at the outer surfaces of the two end electrodes, and means for securing said electrodes and separators under pressure and thereby retaining them in position, substantially as and for the purposes set forth.

18. In a storage battery, in combination, a series of positive and negative electrodes, each electrode comprising a thin metal plate, pieces of porous fabric, an active material applied directly upon the surface of said fabric arranged against and in close contact with the surfaces of said metal plates, a separator of an inert material consisting of a tresswork of loosely-interwoven and compressible strands arranged between said separators and at the outer surfaces of the two end electrodes, and means for securing said electrodes and separators under pressure and thereby retaining them in position, substantially as and for the purposes set forth.

19. In a storage battery, in combination, a series of positive and negative electrodes, each electrode comprising a thin metal plate, pieces of porous fabric, and an active material applied to one side only of each piece of fabric, the sides of the fabric bearing the active material being arranged against and in close contact with the surfaces of said metal plates, a separator of an inert material consisting of a tresswork of loosely-interwoven and compressible strands arranged between said electrodes and at the outer surfaces of the two end electrodes, and means for securing said electrodes and separators under pressure and thereby retaining them in position, substantially as and for the purposes set forth.

20. In a storage battery, in combination, a series of positive and negative electrodes, each electrode comprising a thin metal plate, pieces of porous fabric provided with an application of an active material arranged against and in close contact with the surfaces of said metal plates, stitching passing through said pieces of fabric and said metal plates, a separator of an inert material consisting of a tresswork of loosely-interwoven and compressible strands arranged between said electrodes and at the outer surfaces of the two end electrodes, and means for securing said electrodes and separators under pressure and thereby retaining them in position, substantially as and for the purposes set forth.

21. In a storage battery, in combination, a series of positive and negative electrodes, each electrode comprising a thin metal plate, pieces of porous fabric, each piece of fabric being of approximately double the size of a metal plate, an active material upon the outer surface of each piece of fabric and each piece of fabric being folded upon itself and arranged in close contact against the opposite sides of said metal plates, a separator of an inert material consisting of a tresswork of loosely-interwoven and compressible strands arranged between said electrodes, and at the outer surfaces of the two end electrodes, and means for securing said electrodes and separators under pressure and retaining them in position, substantially as and for the purposes set forth.

22. In a storage battery, in combination, a series of positive and negative electrodes, each electrode comprising a thin metal plate, pieces of porous fabric, each piece of fabric being of approximately double the size of a metal plate, an active material upon the outer surface of each piece of fabric and each piece of fabric being folded upon itself and arranged in close contact against the opposite sides of said metal plates, stitching passing through said pieces of fabric and said metal plates, a separator of an inert material consisting of a tresswork of loosely-interwoven and compressible strands arranged between said electrodes and at the outer surfaces of the two end electrodes, and means for securing said electrodes and separators under pressure and retaining them in position, substantially as and for the purposes set forth.

23. In a storage battery, in combination, a series of positive and negative electrodes, each electrode comprising a thin and flexible sheet of lead-foil, pieces of porous fabric provided with an application of active material, arranged against and in close contact with the surfaces of said lead-foil, a separator of an inert material consisting of a tresswork of loosely-interwoven and compressible strands arranged between said electrodes and the outer surfaces of the two end electrodes, and means for retaining them in position and under pressure, substantially as and for the purposes set forth.

24. In a storage battery, in combination, a series of positive and negative electrodes, each electrode comprising a thin and flexible sheet of lead-foil, pieces of porous fabric, an active material applied to one side only of each piece of fabric, the sides of the fabric bearing the active material being arranged against and in close contact with the surfaces of said lead-foil, stitching passing through said pieces of fabric and said lead-foil, a separator of an inert material consisting of a tresswork of loosely-interwoven and compressible strands arranged between said electrodes and at the outer surfaces of the two end electrodes, and means for securing said electrodes and separators under pressure and retaining them in position, substantially as and for the purposes set forth.

25. In a storage battery, in combination, a series of positive and negative electrodes, each electrode comprising a thin and flexible sheet of lead-foil, pieces of porous fabric, each piece of fabric being of approximately double the size of a sheet of lead-foil, each piece of fabric being folded upon itself and arranged in close contact against the opposite sides of said lead-foil, a separator of an inert material consisting of a tresswork of loosely-interwoven and compressible strands arranged between said electrodes and at the outer surfaces of the two end electrodes, and means for securing said electrodes under pressure and retaining them in position, substantially as and for the purposes set forth.

26. In a storage battery, in combination, a series of positive and negative electrodes, each electrode comprising a thin and flexible sheet of lead-foil, pieces of porous fabric, each piece of fabric being of approximately double the size of a sheet of lead-foil, each piece of fabric being provided with an active material, and each piece of fabric being folded upon itself and arranged in close contact against the opposite sides of said lead-foil, stitching passing through said fabric and sheets of lead-foil, a separator of an inert material consisting of a tresswork of loosely-interwoven and compressible strands arranged between said electrodes and at the outer surfaces of the two end electrodes, and means for securing said electrodes and separators under pressure and thereby retaining them in position, substantially as and for the purposes set forth.

27. In a storage battery, in combination, a series of positive and negative electrodes, each electrode comprising a thin and flexible metal plate, pieces of porous fabric provided with an application of active material arranged against and in close contact with the surfaces of said metal plates, a separator of an inert material between said electrodes and at the outer surfaces of the two end electrodes, an insulator-plate arranged against the outer surface of each end separator, a metallic plate arranged against each insulator-plate, and insulated tie-bolts for connecting all of said parts under pressure and retaining them in position, substantially as and for the purposes set forth.

28. In a storage battery, in combination, a series of positive and negative electrodes, each electrode comprising a thin and flexible metal plate, pieces of porous fabric, and an active material applied to one side only of each piece of fabric, the side of the fabric bearing the active material being arranged against and in close contact with the surfaces of said metal plates, a separator of an inert material between said electrodes and at the outer surfaces of the two end electrodes, an insulator-plate arranged against the outer surface of each end separator, a metallic plate arranged against each insulator-plate, and insulated tie-bolts for connecting all of said parts under pressure and retaining them in position, substantially as and for the purposes set forth.

29. In a storage battery, in combination, a series of positive and negative electrodes, each electrode comprising a thin and flexible metal plate, pieces of porous fabric provided with an application of active material, stitching passing through said pieces of fabric and said metal plates, a separator of an inert material between said electrodes and at the outer surfaces of the two end electrodes, an insulator-plate arranged against the outer surface of each end separator, a metallic plate arranged against each insulator-plate, and insulated tie-bolts for connecting all of said parts under pressure and retaining them in position, substantially as and for the purposes set forth.

30. In a storage battery, in combination, a series of positive and negative electrodes, each electrode comprising a thin and flexible metal plate, pieces of porous fabric, each piece of fabric being of approximately double the size of a metal plate, each piece of fabric being provided with an active material and each piece of fabric being folded upon itself and arranged in close contact against the opposite sides of said metal plates, a separator of an inert material between said electrodes and at the outer surfaces of the two end electrodes, an insulator-plate arranged against the outer surface of each end separator, a metallic plate arranged against each insulator-plate, and insulated tie-bolts for connecting all of said parts under pressure and retaining them in position, substantially as and for the purposes set forth.

31. In a storage battery, in combination, a series of positive and negative electrodes, each electrode comprising a thin and flexible metal plate, pieces of porous fabric, each piece of fabric being of approximately double the size of a metal plate, each piece of fabric being provided with an active material and each piece of fabric being folded upon itself and arranged in close contact against the opposite sides of said metal plates, stitching passing through said pieces of fabric and said metal plates, a separator of an inert material between said electrodes and at the outer surfaces of the two end electrodes, an insulator-plate arranged against the outer surface of each end separator, a metallic plate arranged against each insulator-plate, and insulated tie-bolts for connecting all of said parts under pressure and retaining them in position, substantially as and for the purposes set forth.

32. In a storage battery, in combination, a series of positive and negative electrodes, each electrode comprising a thin and flexible sheet of lead-foil, pieces of porous fabric provided with an application of active material arranged against and in close contact with the surfaces of said lead-foil, a separator of an inert material between said electrodes and at the outer surfaces of the two end electrodes, an insulator-plate arranged against the outer surface of each end separator, a metallic plate arranged against each insulator-plate, and insulated tie-bolts for connecting all of said parts under pressure and retaining them in position, substantially as and for the purposes set forth.

33. In a storage battery, in combination, a series of positive and negative electrodes, each electrode comprising a thin and flexible sheet of lead-foil, pieces of porous fabric, each piece of fabric being of approximately double the size of a sheet of lead-foil, and each piece of fabric being provided on one side only with an active material and each piece of fabric being folded upon itself and having its treated surface arranged against and in close contact with the opposite sides of said lead-foil, stitching passing through said pieces of fabric and sheets of lead-foil, a separator of an inert material between said electrodes and at the outer surfaces of the two end electrodes, an insulator-plate arranged against the outer surface of each end separator, a metallic plate arranged against each insulator-plate, and insulated tie-bolts for connecting all of said parts under pressure and retaining them in position, substantially as and for the purposes set forth.

34. In a storage battery, in combination, a series of positive and negative electrodes, each electrode comprising a thin metal plate, pieces of porous fabric, an active material applied directly upon the outer surface of said fabric and arranged against and in close contact with the surfaces of said metal plates, a separator of an inert material consisting of a tresswork of loosely-interwoven and compressible strands arranged between said electrodes and at the outer surfaces of the two end electrodes, an insulator-plate arranged against the outer surface of each end separator, a metallic plate arranged against each insulator-plate, and insulated tie-bolts for connecting all of the said parts under pressure and retaining them in position, substantially as and for the purposes set forth.

35. In a storage battery, in combination, a series of positive and negative electrodes, each electrode comprising a thin metal plate, pieces of porous fabric provided with an application of active material arranged against and in close contact with the surfaces of said metal plates, stitching passing through said pieces of fabric and said metal plates, a separator of an inert material consisting of a tresswork of loosely-interwoven and compressible strands arranged between said electrodes and at the outer surfaces of the two end electrodes, an insulator-plate arranged against the outer surface of each end separator, a metallic plate arranged against each insulator-plate, and insulated tie-bolts for connecting all of said parts under pressure and retaining them in position, substantially as and for the purposes set forth.

36. In a storage battery, in combination, a series of positive and negative electrodes, each electrode comprising a thin metal plate, pieces of porous fabric, each piece of fabric being of approximately double the size of a metal plate, an active material upon the outer surface of each piece of fabric and each piece of fabric being folded upon itself and arranged in close contact against the opposite sides of said metal plates, a separator of an inert material consisting of a tresswork of loosely-interwoven and compressible strands arranged between said electrodes and at the outer surfaces of the two end electrodes, an insulator-plate arranged against the outer surface of each end separator, a metallic plate arranged against each insulator-plate, and insulated tie-bolts for connecting all of the said parts under pressure and retaining them in position, substantially as and for the purposes set forth.

37. In a storage battery, in combination, a series of positive and negative electrodes, each electrode comprising a thin metal plate, pieces of porous fabric, each piece of fabric being of approximately double the size of a metal plate, each piece of fabric being provided with an active material and each piece of fabric being folded upon itself and arranged in close contact against the opposite sides of said metal plates, stitching passing through said pieces of fabric and said metal plates, a separator of an inert material consisting of a tresswork of loosely-interwoven and compressible strands arranged between said electrodes and at the outer surfaces of the two end electrodes, an insulator-plate arranged against the outer surface of each end separator, a metallic plate arranged against each insulator-plate, and insulated tie-bolts for connecting all of the said parts under pressure and retaining them in position, substantially as and for the purposes set forth.

38. In a storage battery, in combination, a series of positive and negative electrodes, each electrode comprising a thin and flexible sheet of lead-foil, pieces of porous fabric provided with an application of active material, arranged against and in close contact with the surfaces of said lead-foil, a separator of an inert material consisting of a tresswork of loosely-interwoven and compressible strands arranged between said electrodes and at the outer surfaces of the two end electrodes, an insulator-plate arranged against the outer surface of each end separator, a metallic plate arranged against each insulator-plate, and insulated tie-bolts for connecting all of the said parts under pressure and retaining them in position, substantially as and for the purposes set forth.

39. In a storage battery, in combination, a series of positive and negative electrodes, each electrode comprising a thin and flexible sheet of lead-foil, pieces of porous fabric, each piece of fabric being of approximately double the size of a sheet of lead-foil, each piece of fabric being provided with an active material and each piece being folded upon itself and arranged in close contact against the opposite sides of said lead-foil, a separator of an inert material consisting of a tresswork of loosely-interwoven and compressible strands arranged between said electrodes and at the outer surfaces of the two end electrodes, an insulator-plate arranged against the outer surface of each end separator, a metallic plate arranged against each insulator-plate, and insulated tie-bolts for connecting all of the said parts under pressure and retaining them in position, substantially as and for the purposes set forth.

40. In a storage battery, in combination, a series of positive and negative electrodes, each electrode comprising a thin and flexible sheet of lead-foil, pieces of porous fabric, each piece of fabric being of approximately double the size of a sheet of lead-foil, and each piece of fabric being provided with an active material and each piece of fabric being folded upon itself and arranged in close contact against the opposite sides of said lead-foil, stitching passing through said fabric and said lead-foil, a separator of an inert material consisting of a tresswork of loosely-interwoven and compressible strands arranged between said electrodes and at the outer surfaces of the two end electrodes, and an insulator-plate arranged against the outer surface of each end separator, a metallic plate arranged against each insulator-plate, and insulated tie-bolts for connecting all of the said parts under pressure and retaining them in position, substantially as and for the purposes set forth.

In testimony that I claim the invention set forth above I have hereunto set my hand this 19th day of June, 1902.

FRITZ A. FELDKAMP.

Witnesses:
FREDK. C. FRAENTZEL,
GEO. D. RICHARDS.